United States Patent Office 2,810,662
Patented Oct. 22, 1957

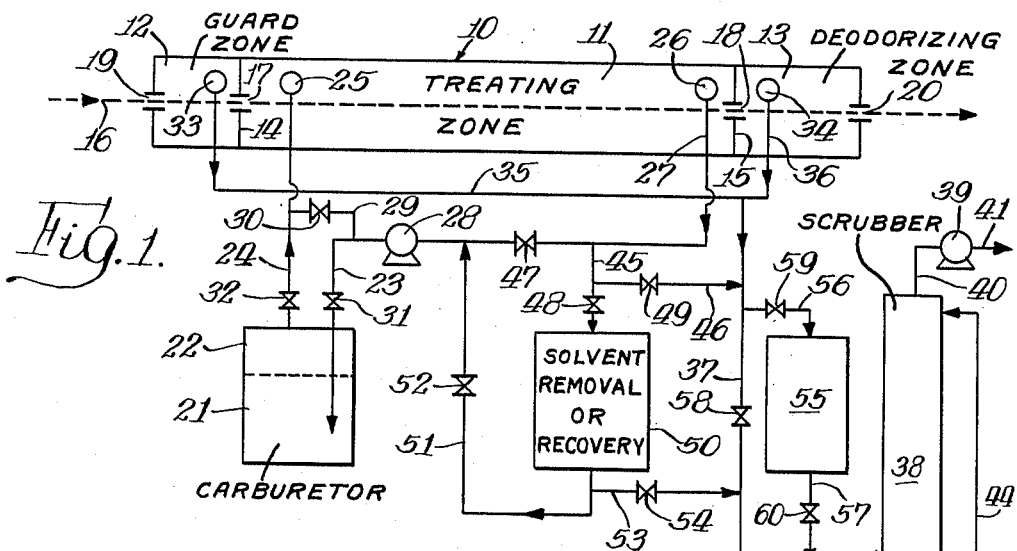

2,810,662
PROCESS AND APPARATUS FOR HARDENING COATING COMPOSITIONS

Herbert L. Barnebey, Gibsonia, Pa., assignor to The Meyercord Co., Chicago, Ill., a corporation of Illinois Application November 18, 1953, Serial No. 392,931

4 Claims. (Cl. 117—62)

This invention relates to improvements in the rapid hardening or drying of protective and decorative coatings of ink, paint, varnish or the like.

In the ordinary drying of protective and decorative coatings such as inks, paints, varnishes, and the like, the resin or oil ingredient of the coating composition hardens by polymerization or oxidation or a combination thereof. However, it is known that the hardening of certain coating compositions can be accomplished by exposure to the vapors of a suitable hardening agent which reacts chemically with the resin or oil ingredients of the coating. Such hardening is achieved by a cross linking of the resins and oils which is chemically quite different from the usual oxidation or polymerization. There are a number of vapor phase or vaporizable inorganic compounds which can function as hardening agents for coating materials of the foregoing type among which may be mentioned hydrogen chloride, nitrogen oxide, ozone, and the various sulfur halides including sulfur monochloride and sulfur dichloride.

The use of sulfur dichloride vapors to effect hardening of protective or decorative coating material is particularly advantageous because of the marked rapidity of the hardening action and also because sulfur dichloride is readily available commercially and is substantially non-toxic. The technique is applicable to a variety of coating materials containing a suitable resin, drying or semi-drying oil, or other compound hardenable by the action of sulfur dichloride vapors. As hereinbefore mentioned, the sulfur dichloride vapor drying method is based on a chemical reaction between the coating and the sulfur dichloride, and it has been found that many deposits or films of coating material acquire at least surface hardness in a matter of seconds without the use of heat. The hardening action continues under the influence of absorbed sulfur dichloride but out of contact with the treating vapors, and hardening is completed in a matter of minutes instead of hours or days. Reference is made to the Thorp et al. Patent 2,528,850 and the Klopfenstein Patent 2,544,839 for a more detailed discussion of the utility and advantages of the use of sulfur dichloride vapors for this purpose.

The present invention involves certain process and apparatus improvements in the manner of utilizing a vaporous hardening agent, particularly sulfur dichloride vapors, in order to obtain greater effectiveness and operating economy. As will appear hereinafter, the invention relates particularly to a novel continuous gas recirculation scheme having numerous advantages over the once-through operations heretofore suggested in the art.

Accordingly, a primary object of the invention is to provide novel improvements in the flow scheme of a process for the hardening of protective and decorative coating materials by exposure to the vapors of a hardening agent.

A further object of the invention is to provide a novel continuous gas recirculating process for the treatment of protective and decorative coating materials with vapors of a suitable hardening agent such as sulfur dichloride.

Another object of the invention is to provide a novel process of the character set forth above which is especially adapted for the hardening of a coating material containing an appreciable quantity of a volatile solvent.

An additional object of the invention is to provide novel means in a vapor treating process of the character described above for preventing the build-up of solvent vapors during recirculation of the treating gas.

Still another object of the invention is to provide a novel sulfur dichloride vapor treating process for the hardening of protective or decorative coating materials in which special provision is made to prevent hydrolysis of the sulfur dichloride by atmospheric moisture.

A still further object of the invention is to provide novel means for neutralizing excess sulfur dichloride after the sulfur dichloride vapor treatment of a protective or decorative coating.

A related object of the invention is to provide novel apparatus for accomplishing the foregoing objects.

Other objects and advantages of the invention will become apparent from the subsequent detailed description taken in conjunction with the accompanying drawing wherein:

Fig. 1 is a schematic flow diagram showing one method of utilizing the process features of the invention;

Fig. 2 is a diagrammatic plan view of a portion of the apparatus shown in Fig. 1;

Fig. 3 is a schematic flow diagram illustrating a modification of the arrangement shown in Fig. 1; and Fig. 4 is a fragmentary schematic diagram showing a further modification of the Fig. 1 arrangement.

Referring first to Figs. 1 and 2, a schematic flow diagram is illustrated in connection with the sulfur dichloride vapor treatment of a plurality of articles having applied thereto a protective or decorative coating of the character hereinbefore mentioned, i. e. containing a suitable resinous ingredient, a drying or semi-drying oil, or other compound capable of being hardened by the action of sulfur dichloride vapors. Examples of resinous ingredients which are particularly suitable for use in hardening with sulfur dichloride vapors are the alkyd resins and the alkyd modified melamine-formaldehyde resins. Although the invention is described hereinafter with particular reference to a sulfur dichloride treating process, it is to be understood that the features and principles of the invention are broadly applicable in the case of any suitable vapor phase or vaporizable hardening agent such as the various inorganic compounds heretofore mentioned.

The treating apparatus comprises, by way of example, a chamber 10 having a central treating zone 11, an inlet guard zone 12 and an outlet guard or deodorizing zone 13. In certain instances it may be desirable to provide heating or temperature control means (not shown) for the treating zone 11. The several zones of the chamber 10 are separated by apertured partitions 14 and 15. A continuous belt or web is indicated schematically at 16 and travels successively through the zones 12, 11 and 13 for conveying the coated articles through the treating apparatus. The apertures in the partitions 14 and 15 are relatively restricted, as indicated at 17 and 18, in order to control the extent of fluid communication by eddy currents or the like between the treating zone 11 and the guard zones 12 and 13. Also, the inlet guard zone 12 has a restricted opening 19 for admission of the web 16 carrying the coated articles thereon, and the outlet guard zone 13 has a restricted outlet opening 20 for egress of the web 16. Although the process is illustrated herein in connection with a continuous travelling web carrying a plurality of separate coated articles, it will be understood that the invention is likewise applicable to the treatment of a continuous coated article such as a sheet, wire, or the like.

For providing a continuous supply of sulfur dichloride vapors, a suitable vaporizing, atomizing, or carburetor means is utilized. Merely by way of example, I have shown a bulk supply of liquid sulfur dichloride, as at 21, which is maintained in a vaporizing or pick-up zone or carburetor 22, and a carrier gas such as air is admitted through an inlet line 23 below the surface of the liquid sulfur dichloride in the zone 22. The bubbling or flow of the carrier gas upwardly through the sulfur dichloride liquid results in vaporization of the latter and the effluent carrier gas laden with sulfur dichloride vapors is introduced through a line 24 into an inlet manifold 25 positioned at one end of the treating zone 11. Of course, any other suitable arrangement for introducing sulfur dichloride vapors into a carrier gas could be employed, e. g. by simply passing the carrier gas over the surface of a liquid supply of sulfur dichloride or by spraying or atomizing the sulfur dichloride. In some cases it may be advisable to provide heating means for the carburetor or vaporizing zone in order to facilitate formation of sulfur dichloride vapors at the desired rate.

The manifold 25 is in this instance in the form of a pipe or conduit (Fig. 2) extending transversely across the inlet end of the treating zone 11 above the web 16 and provided with a plurality of apertures for discharging the sulfur dichloride vapors. An outlet or collecting manifold 26, which is similar to the inlet manifold 25, is located adjacent the opposite end of the treating zone 11 and is connected to a line 27 which communicates with the suction side of a blower 28. The discharge side of the blower 28 is connected to the line 23 which, as hereinbefore described, introduces the carrier gas into the sulfur dichloride vaporizing zone 22. Thus, it will be seen that the illustrated arrangement permits a more or less constant volume of air or other carrier gas to be recirculated or recycled through the treating zone 11, the carrier gas being replenished with sulfur dichloride vapors by passage through the vaporizer or carburetor 22 during the recycling step. It will be understood that the sulfur dichloride vapors flow or move from the inlet end to the outlet end of the treating zone 11 in a direction which, in this instance, is generally concurrent with respect to the passage of the moving web or belt 16 through the treating zone 11. As the sulfur dichloride vapors are in intimate contact with the coated articles for a desired predetermined time within the treating zone 11, it will also be apparent that the desired chemical reaction between the coating composition and the sulfur dichloride vapors takes place during this period so that there is a decrease in the sulfur dichloride content of the carrier gas during its passage through the treating zone 11. However, by reason of the recirculation and vaporizing scheme described above, a relatively large volume of carrier gas may be continuously recirculated through the treating zone so that there is only a relatively slight decrease in sulfur dichloride concentration per pass, and the passage of recirculated gas through the sulfur dichloride supply zone permits continuous introduction of controlled quantities of make-up sulfur dichloride as required in the treating zone 11.

The combination of the gas recirculation scheme with the sulfur dichloride vaporizing means possesses a number of important advantages from a practical process viewpoint. In the first place, of course, the recycle operation results in substantial savings in sulfur dichloride as compared with a once-through operation wherein the effluent sulfur dichloride vapors from the treating zone are normally discharged to waste or are decomposed by suitable chemical treatment. Not only does the recycle operation result in a net saving in sulfur dichloride but it also results in a substantial decrease in the load and size of the equipment necessary for disposing of the waste sulfur dichloride vapors. A further advantage of the recycle operation of the present invention resides in the fact that a more uniform concentration of sulfur dichloride vapor is possible and also a greater degree of control over the concentration of sulfur dichloride in the treating zone can be obtained. Because of the fact that the effluent sulfur dichloride vapors are not wasted, it will be seen that the sulfur dichloride concentration of the inlet treating gas may be regulated at any desired level without fear of excessive waste of sulfur dichloride.

Another, and perhaps even more important, process advantage which results from the recycle operation hereinbefore described is found in the ability of the recycle operation to provide relatively high volume flow rates of treating gas through the treating zone 11 while at the same time maintaining the sulfur dichloride concentration within predetermined limits. Dependent upon the chemical nature and drying properties of the particular coating material involved, the chemical reaction between the sulfur dichloride and the reactive components in the coating material is often accelerated by an increase in the velocity or flow rate of the treating gas relative to the coated articles. It will be readily understood that by control of the operation of the blower 28 and the temperature and other operating conditions of the sulfur dichloride vaporizing unit 22, the present invention affords a high degree of flexibility in the volume flow rate of treating gas through the zone 11 and also in the concentration of sulfur dichloride in the treating gas. For example, for a given coating material which responds more effectively to a high velocity gas stream, the invention permits a substantial increase in the volume flow rate of treating gas through the zone 11 without increasing the sulfur dichloride content of the treating gas beyond the amount required for effective hardening action on the coating material. A by-pass line 29 containing a valve 30 is interposed across the lines communicating with the vaporizer unit 22, and suitable control valves 31 and 32 are also provided in the vaporizer inlet line 23 and outlet line 24, respectively, so that when desired only a portion of the recycle gas from the blower 28 may be passed through the sulfur dichloride vaporizing unit. Obviously, by regulating the proportion of recycle gas which is diverted through the vaporizer 22, both the volume and sulfur dichloride content of the recirculating gas are subject to close control.

As a matter of operating safety and comfort, the guard zones 12 and 13 at the opposite ends of the treating zone 11 are quite important in order to prevent undesired escape of sulfur dichloride vapors into the surrounding atmosphere. These two zones are provided with exhaust headers or manifolds 33 and 34 which discharge through lines 35 and 36, respectively, into a main line 37 communicating with the bottom of a scrubber 38. An exhauster 39 of any suitable type is connected by a line 40 to the top of the scrubber 38 and discharges through a line 41 into the atmosphere. It will be understood that the operation of the exhauster 39 results in the continuous removal of a controlled quantity of gas or vapors from both guard zones 12 and 13 so that sulfur dichloride cannot escape from the treating apparatus to the outside atmosphere at any time. A recirculating pump 42 is provided at the scrubber 38 for recirculating a suitable scrubbing liquid, such as dilute aqueous caustic soda, the pump 42 withdrawing the liquid through a line 43 from the bottom of the scrubber 38 and discharging the liquid through a line 44 into the top of the scrubber 38 so that the scrubbing liquid passes in countercurrent relation with the gases exhausted from the guard zones 12 and 13. In the scrubber 38 the sulfur dichloride in the gas stream introduced through the line 37 is decomposed and neutralized by the action of the water and caustic, and the sulfur dichloride-free vapors are discharged to the atmosphere through the line 41.

Inasmuch as the sulfur dichloride vapor technique is well adapted for hardening or drying of a wide variety of protective or decorative coating compositions including numerous different types of inks, varnishes, paints and the like, instances will frequently be encountered where the coating composition in its freshly applied wet state contains an appreciable quantity of a volatile solvent. In such case the drying operation comprises not only the chemical reaction between sulfur dichloride and the reactive components of the coating composition but also necessarily involves the evaporation of the volatile solvent component of the coating composition. With the recirculation scheme herein described, it will be seen that the evolution of substantial quantities of volatile solvent in the treating zone 11 will result in an increase in the volume of gas withdrawn from the treating zone 11 through the manifold 26 and the line 27. Accordingly, the present invention provides means for preventing the build up or accumulation of solvent vapors in the recirculating gas stream in such instances. To this end, a portion of the recirculating gas stream may be vented or bled off from the line 27 through a line 45 and a line 46 into the scrubber inlet line 37 and thence into the scrubber 38. By continuously or intermittently venting a portion of the recycle stream through the scrubber system, undesirable accumulation of organic solvent vapors in the treating gas system is effectively prevented. The lines 27, 45 and 46 are provided with suitable control valves 47, 48 and 49 respectively, for controlling the flow of the recycle gas stream.

If desired, the solvent vapors evolved from the coating materials in the treating zone 11 may be removed or recovered in part or in toto rather than being discharged to waste through the scrubbing system. For this purpose, a solvent removal or recovery unit 50 is interposed in the system so that the recycle treating gas may be introduced thereto through a line 45. The solvent removal or recovery unit 50 may be of any suitable type well known to those skilled in the art, for example, a condenser wherein the solvent component of the gas stream is condensed to the liquid state and recovered with the residual uncondensible gas being returned to the system, or an adsorber wherein the solvent is more or less selectively removed by a suitable solid adsorbent. The gas emerging from the recovery unit 50 may be returned through a line 51 containing a valve 52 to the inlet side of the recirculating blower 28, or if desired, the entire gas stream or a part thereof issuing from the solvent recovery unit 50 may be passed through a line 53 containing a valve 54 to the scrubber inlet line 37 and thence to the scrubber 38. When the unit 50 comprises a condenser, it may be necessary to reheat the exit gas to room temperature before passage through the carburetor 22.

Accordingly, in the case of the drying or hardening of a coating composition containing an appreciable quantity of volatile solvent, the invention contemplates the prevention of solvent vapor accumulation in the recirculating gas system by any one of several means: (1) venting a portion of the recycle gas stream through the scrubbing system to waste, (2) passing a portion or all of the recycle gas stream through a solvent removal or recovery unit prior to recirculation thereof, (3) passing a portion of the recycle gas stream through a solvent removal or recovery unit and then venting the effluent gas through the scrubbing system to waste, or (4) a combination of the foregoing.

Another solvent recovery problem may also arise in connection with the exhauster system heretofore described for preventing escape of sulfur dichloride vapors from the treating apparatus. When the coating composition undergoing treatment contains an appreciable quantity of a volatile solvent, it will be apparent that the exhaust gases withdrawn from the guard zones 12 and 13 through the manifolds 33 and 34 will also contain solvent vapors. In some instances it may be economically important or desirable to recover these solvent vapors rather than to discharge them to the scrubber 38 where they may escape to waste or may complicate the operation of the scrubber. Thus, I provide an auxiliary solvent removal or recovery unit 55 having an inlet line 56 and an outlet line 57 so that the exhaust vapors from the header lines 35 and 36, or a portion thereof, may be passed from the line 37 through the unit 55 and thence back into the line 37 and the scrubber 38. The unit 55 may be of the same type heretofore described in connection with the main solvent removal or recovery unit 50. The lines 37, 56 and 57 are provided with valves 58, 59, and 60, respectively, for controlling the flow of the exhaust vapors.

In Fig. 3, I have illustrated a modification of the invention which is particularly important where the coated article being subjected to sulfur dichloride vapor treatment is sensitive to the action of the decomposition products of sulfur dichloride, particularly hydrochloric acid. For example, metals such as steel are subject to corrsion and cellulosic materials such as paper and regenerated cellulose tend to be adversely affected. As described hereinbefore in connection with Fig. 1, the guard zones 12 and 13 at the inlet and outlet of the sulfur dichloride vapor treating zone are connected to the exhauster system so that there is a predetermined controlled leakage into the guard zones of atmospheric air from the exterior of the apparatus. Because of the presence of normal amounts of moisture in the air, there is a tendency for a limited degree of hydrolysis of the sulfur dichloride to take place with the result that hydrochloric acid may be present in the treating system or in the treated articles. In the case of articles made of metal, cellulosic material, or the like, even small quantities of hydrochloric acid may be undesirable because of the corrosive and other adverse effects of the acid.

In Fig. 3 this objectionable feature is overcome by means of the addition of dry or heated air supply chambers to the same general apparatus illustrated in Fig. 1. Thus, the treating zone 11, the inlet guard zone 12, the outlet guard zone 13, the exhaust header 35, and the sulfur dichloride vapor supply line 24 and discharge line 27 are substantially the same as in Fig. 1, the remaining details being omitted for the sake of simplicity. However, at each end of the apparatus beyond the guard chambers 12 and 13, I have provided a pair of air supply chambers 61 and 62 which are separated from the guard chambers 12 and 13 by suitably apertured partitions 63 and 64. Dry air is supplied to the chambers 61 and 62 by means of a system comprising a blower 65 which forces air through a drier zone 66, which, for example, may contain a drying agent or dessicant, and discharges the dry air through branch lines 67 and 68 into the air supply chambers 61 and 62, respectively. By means of the blower 65 the dry air supply chambers 61 and 62 are maintained under slight pressure and the guard chambers 12 and 13 function in exactly the same manner as hereinbefore described except for the fact that the air which leaks into the guard chambers is dry air only. Accordingly, there is no opportunity within the treating apparatus for appreciable hydrolysis of sulfur dichloride with consequent danger of corrosion or the like. Instead of containing a dessicant or drying agent, the zone 66 may in some instances comprise merely a heating zone which serves to raise the temperature of the air passing therethrough. The heated air is then introduced into the air supply chambers 61 and 62, and commingles with ambient air drawn in from the outside atmosphere with the result that the relative humidity of the mixture is considerably lower than that of the outside air alone.

In certain cases this heating technique will be sufficient to prevent excessive hydrolysis of sulfur dichloride in the treating apparatus. Of course, a combination of heating the air and drying the same with a drying agent or the like may be used if desired.

In Fig. 4 I have illustrated a still further modification of the invention wherein additional precautions are taken to prevent the adverse effect of sulfur dichloride or its hydrolysis products. In the case of articles of metal, cellulose, or the like, it is quite important that the contact or exposure time of the article with sulfur dichloride be held to a minimum. The outlet guard or deodorizing zone 13 described in connection with Fig. 1, of course, results in a certain degree of rapid removal of sulfur dichloride vapors by reason of the leakage of atmospheric air into the zone 13 and the passage thereof over the coated articles while being exhausted through the header 34. However, in the event that more complete removal of sulfur dichloride is required, I have shown in Fig. 4 the outlet end of the apparatus having added thereto a neutralization zone 69 and a final deodorizing or guard zone 70 which are separated by an apertured partition 71. The final guard zone 70 is connected to the scrubbing and exhaust system by means of a line 72 in the same manner as the guard zone 13. A suitable neutralizing fluid such as ammonia gas is introduced to the neutralizing zone 69 through a line 73. Thus, as the treated articles emerge from the treating zone 11 on the moving carrier or web 16, a preliminary removal of sulfur dichloride vapors is first effected in the deodorizing or guard zone 13 which is connected to the exhauster system in the manner hereinbefore described. The articles next pass to the neutralizing zone 69 wherein all traces of sulfur dichloride are completely eliminated by chemical neutralization with ammonia or the like, and finally the articles emerge from the apparatus through a final guard zone 70 which prevents escape of ammonia or other obnoxious vapors into the surrounding atmosphere.

Although the invention has been described above in connection with certain more or less specific embodiments thereof, it will be understood that various modifications and equivalent schemes may be resorted to without departing from the scope of the invention as defined in the appended claims.

I claim:

1. In the sulfur dichloride vapor treatment of a coating composition containing a compound hardenable by the action of sulfur dichloride, the improvement which comprises supplying sulfur dichloride vapor to a treating zone, passing a coated article through said treating zone and therein subjecting the coating composition to the hardening action of the sulfur dichloride vapor, maintaining guard zones of reduced pressure at the inlet and outlet ends of said treating zone to prevent the escape of sulfur dichloride vapor from the treating zone into the atmosphere, pretreating atmospheric air to reduce the moisture content or relative humidity thereof, and supplying the pretreated air to said guard zones whereby to minimize hydrolysis of sulfur dichloride by contact with atmospheric moisture.

2. In the sulfur dichloride vapor treatment of a coating composition containing a compound hardenable by the action of sulfur dichloride, the improvement which comprises supplying sulfur dichloride vapor to a treating zone, passing a coated article through said treating zone and therein subjecting the coating composition to the hardening action of the sulfur dichloride vapor, maintaining guard zones of reduced pressure at the inlet and outlet ends of said treating zone to prevent the escape of sulfur dichloride vapor from the treating zone into the atmosphere, and supplying predried air to said guard zones whereby to minimize hydrolysis of sulfur dichloride by contact with atmospheric moisture.

3. In the sulfur dichloride vapor treatment of a coating composition containing a compound hardenable by the action of sulfur dichloride, the improvement which comprises supplying sulfur dichloride vapor to a treating zone, passing a coated article through said treating zone and therein subjecting the coating composition to the hardening action of the sulfur dichloride vapor, maintaining guard zones of reduced pressure at the inlet and outlet ends of said treating zone to prevent the escape of sulfur dichloride vapor from the treating zone into the atmosphere, and supplying preheated air to said guard zones for reducing the relative humidity therein whereby to minimize hydrolysis of sulfur dichloride by contact with atmospheric moisture.

4. An apparatus for effecting sulfur dichloride vapor treatment of a coating composition containing a compound hardenable by the action of sulfur dichloride, said apparatus comprising means providing a generally elongated treating zone, means for supplying sulfur dichloride vapor to said treating zone, means providing a pair of guard zones at opposite ends of said treating zone and having restricted fluid communication with said treating zone and with the outside atmosphere, exhauster means connected to said guard zones for withdrawing vapors therefrom, air treating means disposed exteriorly of said guard zones for reducing the moisture content or increasing the temperature of air passed therethrough, and means for passing air through said air treating means and then supplying the treated air of reduced moisture content or relative humidity to said guard zones whereby to minimize hydrolysis of sulfur dichloride by contact with atmospheric moisture.

References Cited in the file of this patent

UNITED STATES PATENTS

| Number | Name | Date |
| --- | --- | --- |
| 890,252 | Thompson | June 9, 1908 |
| 1,437,980 | Lewis et al. | Dec. 5, 1922 |
| 1,463,884 | Gardner | Aug. 7, 1923 |
| 1,494,830 | Cook | May 20, 1924 |
| 1,631,722 | Emery | June 7, 1927 |
| 1,725,129 | Carpenter et al. | Aug. 20, 1929 |
| 1,827,530 | Le Grand | Oct. 13, 1931 |
| 1,968,764 | Harris | July 31, 1934 |
| 2,119,261 | Andrews | May 31, 1938 |
| 2,528,850 | Thorp | Nov. 7, 1950 |
| 2,535,087 | Munters | Dec. 26, 1950 |